United States Patent
Krishnan et al.

(10) Patent No.: US 9,453,417 B2
(45) Date of Patent: Sep. 27, 2016

(54) TURBINE INTRUSION LOSS REDUCTION SYSTEM

(71) Applicant: GENERAL ELECTRIC COMPANY, Schenectady, NY (US)

(72) Inventors: Prabakaran Modachur Krishnan, Karnataka (IN); Kevin Joseph Barb, Halfmoon, NY (US); Srikanth Deshpande, Karnataka (IN); Moorthi Subramaniyan, Karnataka (JP)

(73) Assignee: General Electric Company, Schenectady, NY (US)

( * ) Notice: Subject to any disclaimer, the term of this patent is extended or adjusted under 35 U.S.C. 154(b) by 931 days.

(21) Appl. No.: 13/633,651

(22) Filed: Oct. 2, 2012

(65) Prior Publication Data

US 2014/0093359 A1    Apr. 3, 2014

(51) Int. Cl.
*F01D 5/14* (2006.01)
*F01D 9/04* (2006.01)
*F01D 11/08* (2006.01)

(52) U.S. Cl.
CPC .............. *F01D 5/143* (2013.01); *F01D 5/145* (2013.01); *F01D 9/04* (2013.01); *F01D 9/041* (2013.01); *F01D 11/08* (2013.01); *F05D 2240/125* (2013.01); *F05D 2240/126* (2013.01); *Y02E 20/16* (2013.01)

(58) Field of Classification Search
CPC .. F01D 11/005; F01D 11/001; F01D 11/006; F01D 9/04; F01D 9/041; F01D 9/047; F01D 25/246; F01D 11/08; F01D 5/143; F01D 5/145; F05D 2240/125; F05D 2240/126; Y02E 20/16
See application file for complete search history.

(56) References Cited

U.S. PATENT DOCUMENTS

| 779,972 A | 1/1905 | Rowland et al. |
| 4,869,640 A * | 9/1989 | Schwarz .............. F01D 11/001 415/115 |

(Continued)

FOREIGN PATENT DOCUMENTS

| EP | 1221539 A2 | 7/2002 |
| EP | 1270874 A1 | 1/2003 |

(Continued)

OTHER PUBLICATIONS

Rosic et al., "The Influence of Shroud and Cavity Geometry on Turbine Performance: An Experimental and Computational Study—Part 1: Shroud Geometry", Journal of Turbomachinery, Oct. 2008, vol. 130, 10 pages.

(Continued)

*Primary Examiner* — Craig Kim
*Assistant Examiner* — Adam W Brown
(74) *Attorney, Agent, or Firm* — Hoffman Warnick LLC; Ernest G. Cusick

(57) ABSTRACT

Systems and devices configured to reduce windage and mixing losses in a turbine by redirecting and/or aligning a direction of a leakage flow with the flowpath of the main flow of a turbine are disclosed. In one embodiment, a device includes: a base configured to connect to a diaphragm of a turbine; and a radial portion connected to the base and extending radially inboard from the base toward a rotor of the turbine, the radial portion oriented to adjust a direction of travel of a leakage flow of working fluid radially inboard at an angle complementary to a primary working fluid path of the turbine.

11 Claims, 12 Drawing Sheets

(56) References Cited

U.S. PATENT DOCUMENTS

| | | | |
|---|---|---|---|
| 5,211,533 A * | 5/1993 | Walker | F01D 11/001 415/115 |
| 5,545,004 A * | 8/1996 | Ho | F01D 5/081 415/115 |
| 6,077,035 A | 6/2000 | Walters et al. | |
| 6,672,070 B2 | 1/2004 | Bland et al. | |
| 6,779,972 B2 | 8/2004 | Farrell et al. | |
| 7,029,235 B2 | 4/2006 | Liang | |
| 7,044,710 B2 | 5/2006 | Naik et al. | |
| 7,114,339 B2 | 10/2006 | Alvanos et al. | |
| 7,189,055 B2 * | 3/2007 | Marini | F01D 5/081 415/115 |
| 7,244,104 B2 | 7/2007 | Girgis et al. | |
| 7,489,811 B2 | 2/2009 | Brummel et al. | |
| 7,654,091 B2 | 2/2010 | Al-Roub et al. | |
| 8,616,838 B2 * | 12/2013 | Chiu | F01D 11/001 415/168.1 |
| 2005/0244270 A1 | 11/2005 | Liang | |
| 2006/0078193 A1 | 4/2006 | Brummel et al. | |
| 2009/0285682 A1 | 11/2009 | Baker et al. | |
| 2010/0213716 A1 | 8/2010 | Santoro | |
| 2010/0270800 A1 | 10/2010 | Krietzman et al. | |
| 2010/0272566 A1 | 10/2010 | Durocher et al. | |
| 2010/0281868 A1 | 11/2010 | Dede et al. | |
| 2011/0146294 A1 | 6/2011 | Townsend | |

FOREIGN PATENT DOCUMENTS

| | | |
|---|---|---|
| EP | 2096262 A1 | 9/2009 |
| FR | 896166 A | 2/1945 |
| FR | 1086314 A | 2/1955 |
| JP | 2004011553 A * | 1/2004 |
| WO | 9816724 A1 | 4/1998 |
| WO | 03052240 A2 | 6/2003 |
| WO | 2011026503 A1 | 3/2011 |

OTHER PUBLICATIONS

Rosic et al., "The Influence of Shroud and Cavity Geometry on Turbine Performance: An Experimental and Computational Study—Part 2: Exit Cavity Geometry", Journal of Turbomachinery, Oct. 2008, vol. 130, 10 pages.

Rosic et al., "Control of Shroud Leakage Loss by Reducing Circumferential Mixing", Journal of Turbomachinery, Apr. 2008, vol. 130, 7 pages.

EP Search Report and Written Opinion dated Nov. 26, 2013, issued in connection with corresponding EP Patent Application No. 13186846.5.

* cited by examiner

TURBINE INTRUSION LOSS REDUCTION SYSTEM

BACKGROUND OF THE INVENTION

The subject matter disclosed herein relates to turbines and, more particularly, to systems and devices for reducing intrusion losses in a working fluid flowpath during turbine operation.

Some power plant systems, for example certain nuclear, simple cycle and combined cycle power plant systems, employ turbines in their design and operation. Some of these turbines are driven by a flow of high temperature steam which is directed over and/or through a series of stages (e.g., alternating stationary and rotary airfoils/buckets/blades) within the turbine. As the main flow passes through the turbine, portions of the flow may leak from the main flowpath. This leakage flow may travel through the clearance formed between the tip of one of the blades and the turbine casing rather than traveling through the stage/airfoils. As this leakage flow travels through the turbine, it may randomly contact turbine surfaces (e.g., blade roots, the turbine casing, etc.) and be redirected out into the main flow at an angle substantially different (e.g., perpendicular) to a direction of the flowpath of the working fluid. As a result of variances in pressure, momentum, and direction of travel between the leakage flow and the working fluid flowpath, this reintroduction and random mixing of the leakage flow and working fluid flowpath may create intrusion losses, windage losses, and system inefficiencies.

BRIEF DESCRIPTION OF THE INVENTION

Devices for redirecting leakage flows in turbine flowpaths to angles which are complementary to a path of a main flow of working fluid in the turbine are disclosed. In one embodiment, a device includes: a base configured to connect to a diaphragm of a turbine; and a radial portion connected to the base and extending radially inboard from the base toward a rotor of the turbine, the radial portion oriented to adjust a direction of travel of a leakage flow of working fluid radially inboard at an angle complementary to a primary working fluid path of the turbine.

A first aspect of the disclosure provides a device including: a base configured to connect to a diaphragm of a turbine; and a radial portion connected to the base and extending radially inboard from the base toward a rotor of the turbine, the radial portion oriented to adjust a direction of travel of a leakage flow of working fluid radially inboard at an angle complementary to a primary working fluid path of the turbine.

A second aspect provides a turbine diaphragm system including: an outer ring; a set of nozzles disposed circumferentially about an interior of the outer ring, the set of nozzles extending radially inboard; a device connected to an inner surface of the outer ring and extending circumferentially about the outer ring covering a portion of the set of nozzles, the device oriented to adjust a direction of travel of a leakage flow of working fluid radially inward at an angle complementary to a primary working fluid path of a turbine; and an inner ring radially inboard of the outer ring and connected to the set of nozzles.

A third aspect provides a turbine including: a stator; a turbine diaphragm system disposed within the stator, the turbine diaphragm system including: an outer ring; a set of nozzles disposed circumferentially about an interior of the outer ring, the set of nozzles extending radially inboard; a device connected to an inner surface of the outer ring and extending circumferentially about the outer ring covering a portion of the set of nozzles, the device oriented to adjust a direction of travel of a leakage flow of working fluid radially inboard at an angle complementary to a working fluid passage of the turbine; and an inner ring radially inboard of the outer ring and connected to the set of nozzles; and a rotor configured radially inboard of the working fluid passage.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the disclosure are not necessarily to scale. The drawings are intended to depict only typical aspects of the disclosure, and therefore should not be considered as limiting the scope of the disclosure. It is understood that elements similarly numbered between the FIGURES may be substantially similar as described with reference to one another. Further, in embodiments shown and described with reference to FIGS. 1-12, like numbering may represent like elements. Redundant explanation of these elements has been omitted for clarity. Finally, it is understood that the components of FIGS. 1-12 and their accompanying descriptions may be applied to any embodiment described herein.

DETAILED DESCRIPTION OF THE INVENTION

As indicated above, aspects of the invention provide for systems and devices configured to reduce windage and mixing losses in a turbine by redirecting and/or aligning a direction of a leakage flow with the working fluid flowpath of the turbine. The device includes a base which is connected to the diaphragm of the turbine and is located proximate a nozzle tip of the turbine in a path of the leakage flow. A radial portion of the device is positioned in a path of the leakage flow and extends radially inboard from the base toward a rotor of the turbine. During operation the device is configured to contact the leakage flow and channel/guide the leakage flow from a leakage region (e.g., between the diaphragm and airfoil tips) in the turbine back into the main flowpath (e.g., through the stages and airfoils of the turbine) at an angle which is substantially complementary to the working fluid flowpath. The device adjusts/reduces a swirl of the leakage flow prior to introduction/mixing with the working fluid flowpath.

Figure 1:
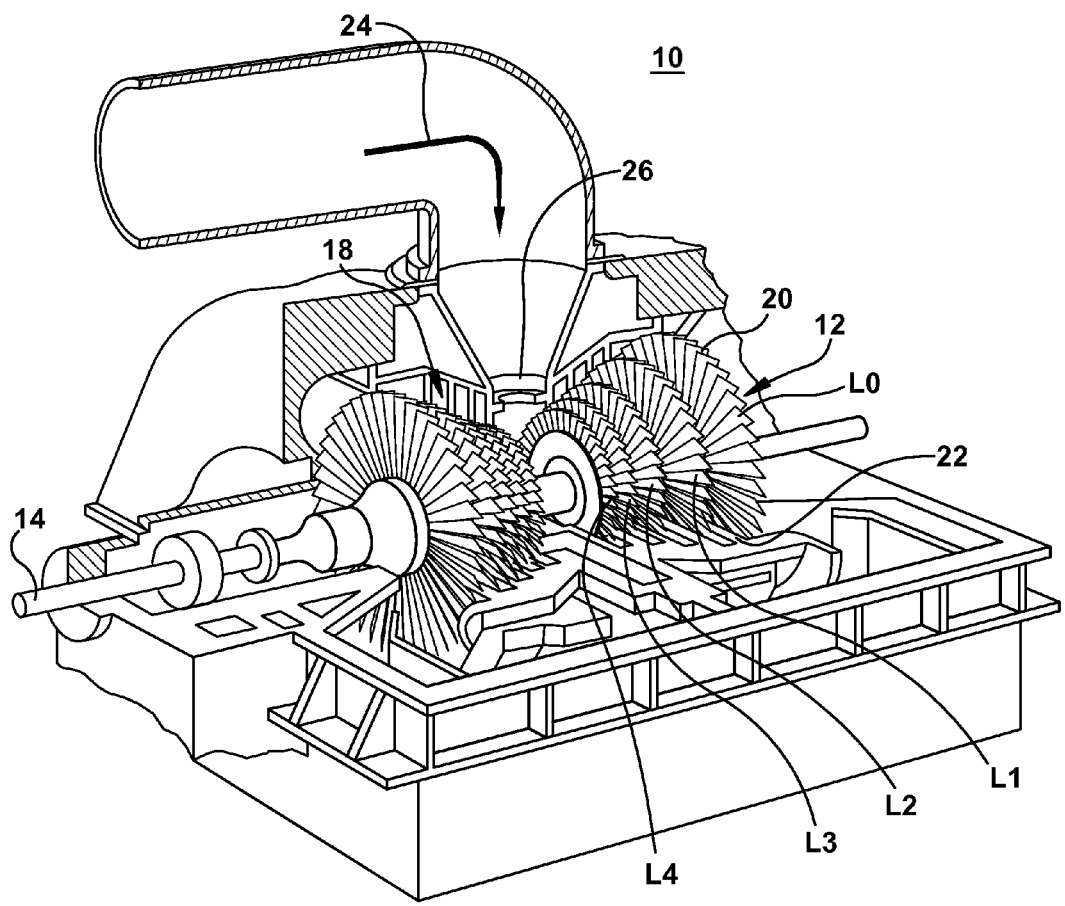
FIG. 1 a three-dimensional partial cut-away perspective view of a portion of a turbine according to an embodiment of the invention.

Turning to the FIGURES, embodiments of systems and devices are shown, which are configured to reduce windage and mixing losses in a turbine by redirecting and/or aligning a direction of a leakage flow with the flowpath of the working fluid flowpath of the turbine. Each of the components in the FIGURES may be connected via conventional means, e.g., via a common conduit or other known means as is indicated in FIGS. 1-12. Referring to the drawings, FIG. 1 shows a perspective partial cut-away illustration of a gas or steam turbine 10. Turbine 10 includes a rotor 12 that includes a rotating shaft 14 and a plurality of axially spaced rotor wheels 18. A plurality of rotating blades 20 are mechanically coupled to each rotor wheel 18. More specifically, blades 20 are arranged in rows that extend circumferentially around each rotor wheel 18. A plurality of stationary vanes 22 extend circumferentially around shaft 14, and the vanes are axially positioned between adjacent rows of blades 20. Stationary vanes 22 cooperate with blades 20 to form a stage and to define a portion of a steam flow path through turbine 10.

In operation, gas or steam 24 enters an inlet 26 of turbine 10 and is channeled through stationary vanes 22. Vanes 22 direct gas or steam 24 downstream against blades 20. Gas or steam 24 passes through the remaining stages imparting a force on blades 20 causing shaft 14 to rotate. At least one end of turbine 10 may extend axially away from rotating shaft 12 and may be attached to a load or machinery (not shown) such as, but not limited to, a generator, and/or another turbine.

In one embodiment, turbine 10 may include five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or less than five stages. Also, as will be described herein, the teachings of the invention do not require a multiple stage turbine.

Figure 2:
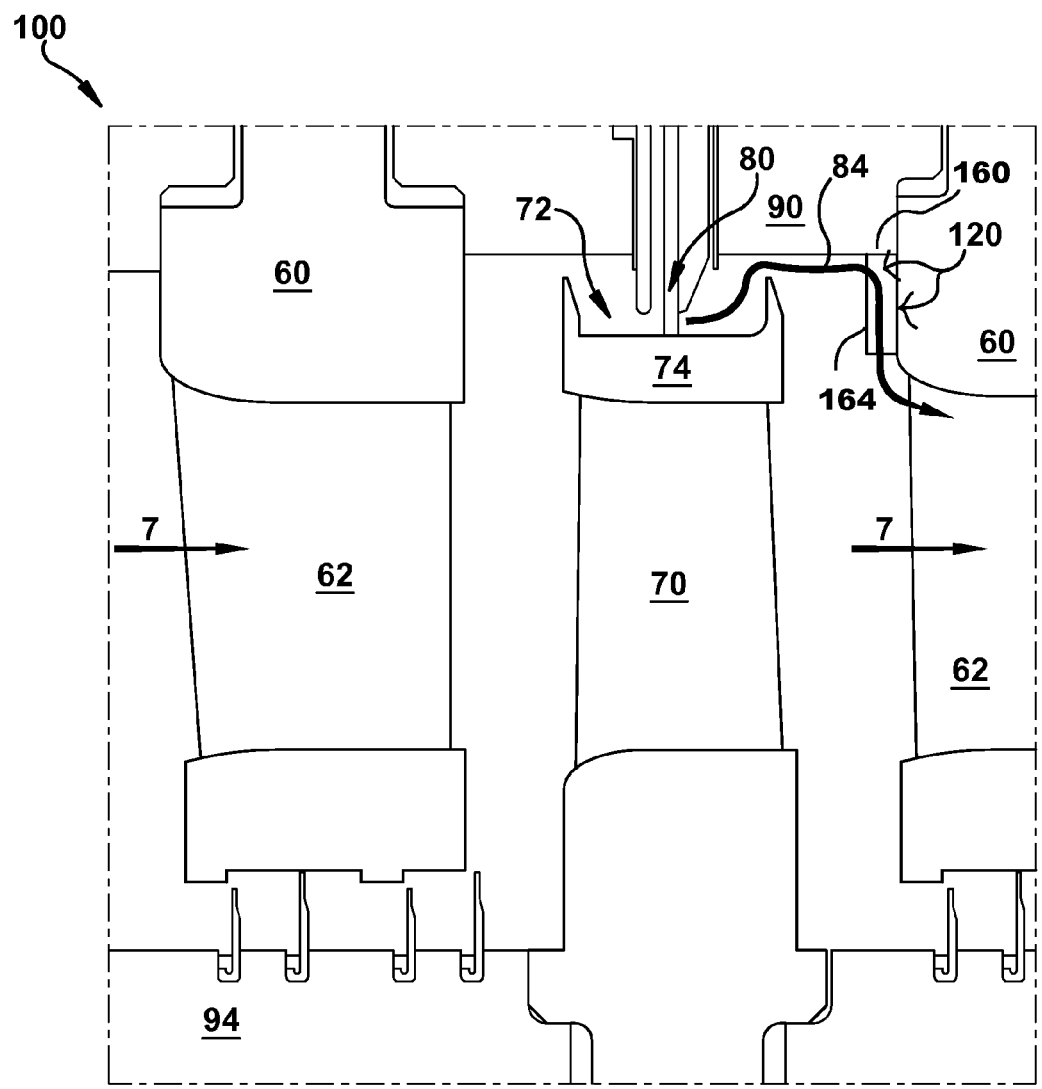
FIG. 2 shows a partial cut-away schematic view of a portion of a turbine according to an embodiment of the invention.

Turning to FIG. 2, a partial cross-sectional view of a turbine 100 is shown according to embodiments of the invention. Turbine 100 may include a rotor 94 (partially shown in FIG. 2) and a diaphragm 90 (partially shown in FIG. 2) substantially surrounding rotor 94. A turbine bucket 70 may be secured within rotor 94 and located between a set of nozzles 62 connected to diaphragm 90. As seen in FIG. 2, set of nozzles 62 may include a plurality of nozzles 62 which define stages of turbine 100. Nozzles 62 and turbine buckets 70 may radially extend respectively from diaphragm 90 and rotor 94, such that nozzles 62 and turbine buckets 70 are interspersed along an axial length of turbine 100. A working fluid, such as steam, may be directed to a downstream location, along a working fluid passage 7 (e.g., the main flowpath) through turbine buckets 70 and nozzles 62 to assist the rotation of rotor 94.

As can be seen in FIG. 2, a leakage flow 84 of working fluid may leak/escape from working fluid passage 7 and pass about turbine bucket 70 through a cavity 72 between a bucket tip 74 and a set of seal teeth 80 which extend from diaphragm 90. Leakage flow 84 may travel axially along turbine 100 substantially parallel to working fluid passage 7 until contacting a surface of turbine 100 (e.g., a nozzle 62, a nozzle tip 60, etc.) and being forced back into working fluid passage 7. In an embodiment, turbine 100 may include a device 120 configured to redirect leakage flow 84 into working fluid passage 7 at an angle which is substantially complementary and/or common with a direction of travel of working fluid in working fluid passage 7. Device 120 may include a base 160 connected to diaphragm 90 of turbine 100, and a radial portion 164 connected to base 160 and extending radially inboard from base 160 toward rotor 94. Radial portion 164 may be oriented to adjust a flow characteristic of leakage flow 84 (e.g., adjust a direction of travel of leakage flow 84). In one embodiment, radial portion 164 may direct leakage flow 84 radially inboard at an angle complementary (e.g., at an angle substantially consistent with, in a consistent direction of travel therewith, etc.) to a primary working fluid path of turbine 100. Device 120 may be disposed intermittently or continuously about (e.g., circumferentially) diaphragm 90, turbine 100 and/or working fluid passage 7. In one embodiment, device 120 may be oriented at a pitch relative working fluid passage 7 and/or leakage flow 84. In one embodiment, device 120 may be formed as a portion of diaphragm 90. In another embodiment, device 120 may be connected (e.g., welded, brazed, bolted, etc.) to diaphragm 90. Device 120 may adjust a swirl of leakage flow 84 prior to reintroduction into working fluid passage 7. In one embodiment, device 120 may adjust a swirl of leakage flow 84 by about 25 degrees relative a baseline swirl of leakage flow 84.

Figure 3:
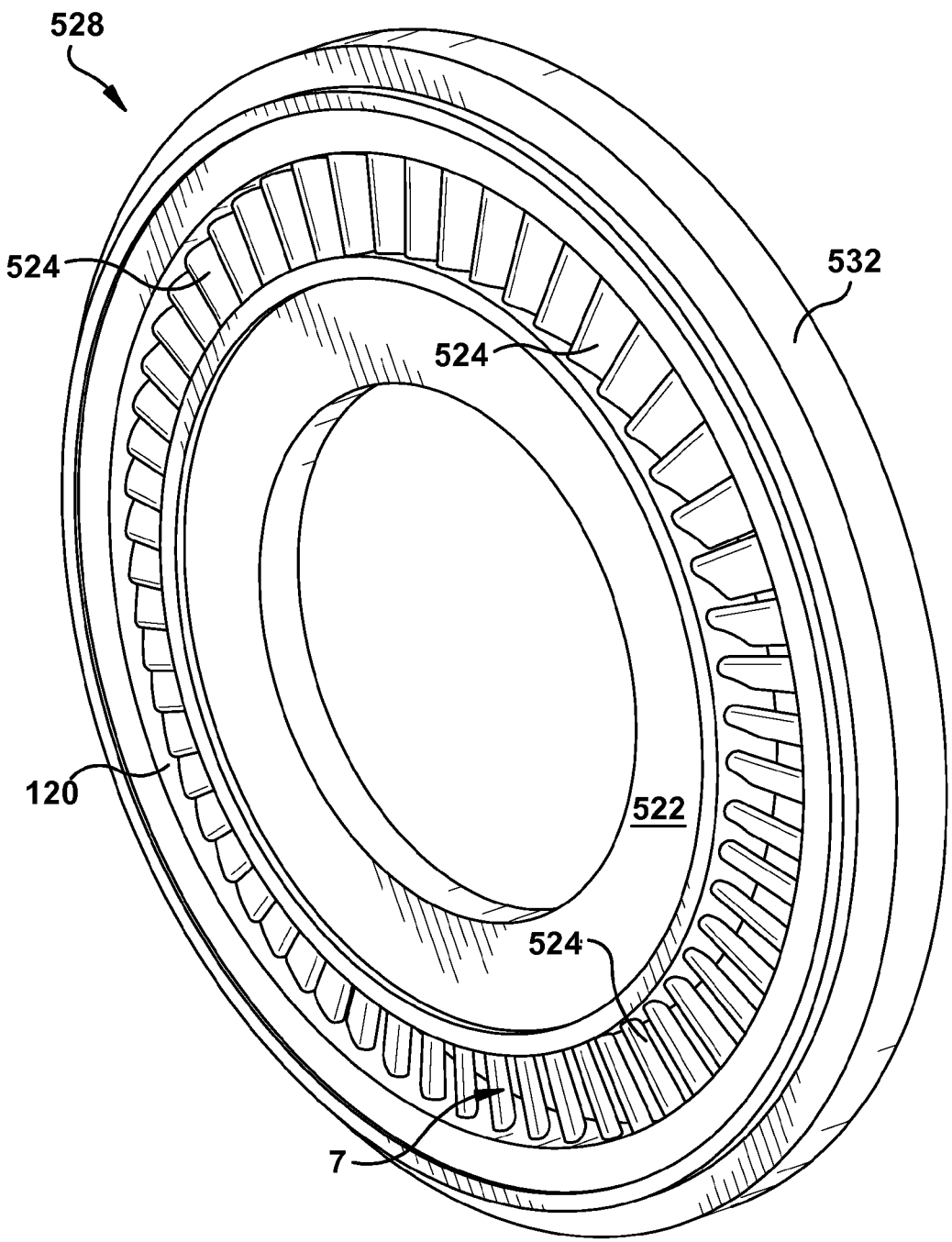
FIG. 3 shows a partial three-dimensional perspective view of a turbine diaphragm system according to an embodiment of the invention.

Turning to FIG. 3, a partial three-dimensional perspective view of an embodiment of a turbine diaphragm system 528 is shown. In this embodiment, turbine diaphragm system 528 includes an outer ring 532 which is configured to be disposed about a rotor within a turbine shell (e.g., a stator). A set of nozzles 524 may be connected to a radially inboard surface of outer ring 532. Set of nozzles 524 may be oriented circumferentially about outer ring 532 and may extend radially inboard from outer ring 532 and partially define working fluid passage 7. An inner ring 522 may be located radially inboard of outer ring 532 and connected to set of nozzles 524. In an embodiment, device 120 may be connected to an inner surface of outer ring 532. Device 120 may extend circumferentially about turbine diaphragm system 528 and axially cover/shield a portion of set of nozzles 524. In one embodiment, turbine diaphragm system 528 may be formed as a uniform component/body (e.g., one element formed from a single piece of material). In another embodiment, turbine diaphragm system 528 may be formed as an assembly of a plurality of components (e.g., nozzles, rings, etc.) which may include any materials now known or later developed.

Figure 4:
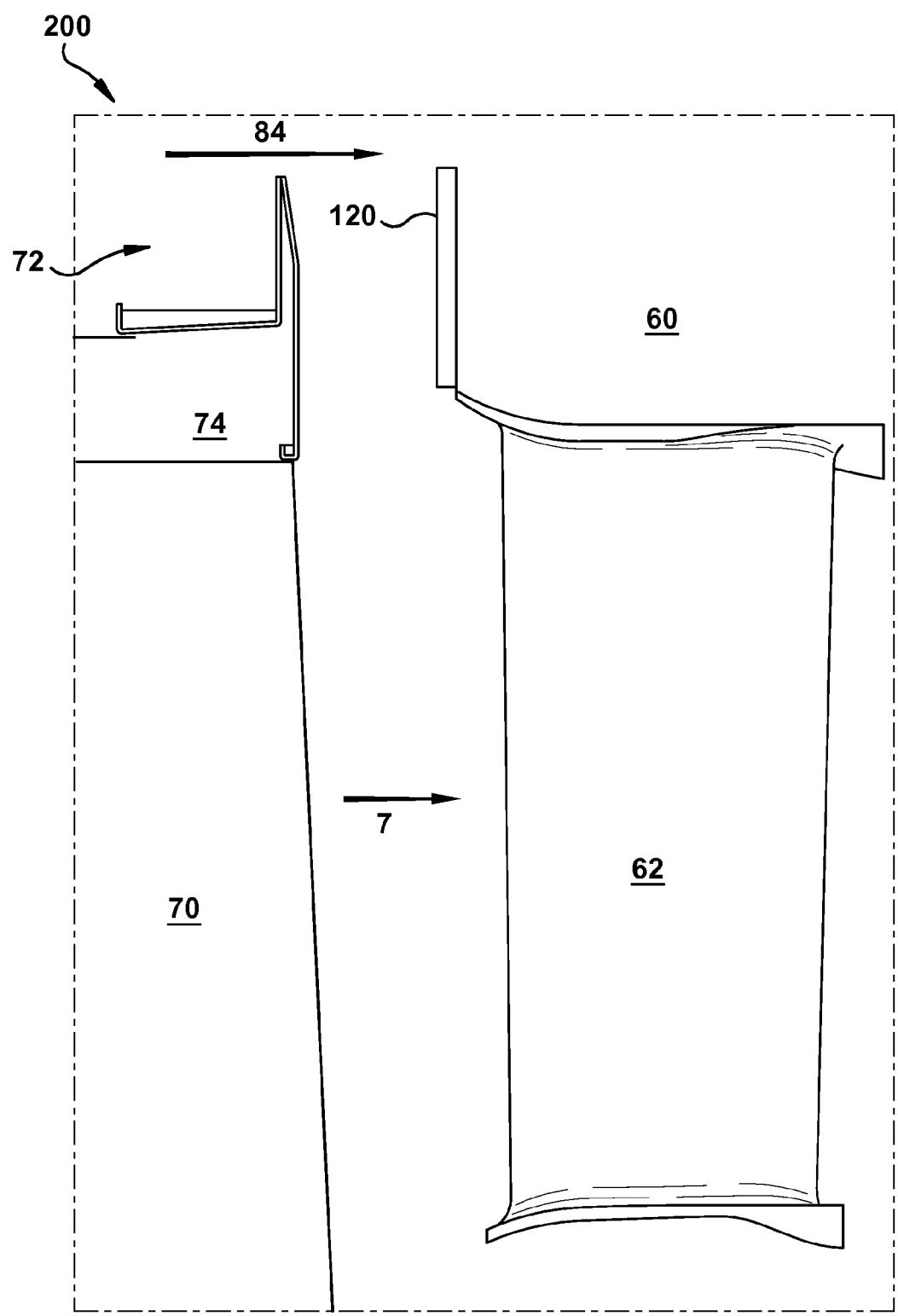
FIG. 4 shows a three-dimensional perspective view of a portion of a turbine according to an embodiment of the invention.

Turning to FIG. 4, a partial three-dimensional perspective view of a portion of an environment 200 including an embodiment of device 120 is shown connected to nozzle tip 60. In this embodiment, device 120 is positioned between nozzle tip 60 and bucket tip 74 such that leakage flow 84 is aligned relative nozzle tip 60 during reintroduction to working fluid passage 7. Leakage flow 84 may travel through cavity 72 and contact/flow into device 120 which shields nozzle tip 60 and directs leakage flow 84 partially radially inboard to working fluid passage 7. In one embodiment, device 120 is pitched to maintain a portion of the axial direction/momentum of leakage flow 84.

Figure 5:
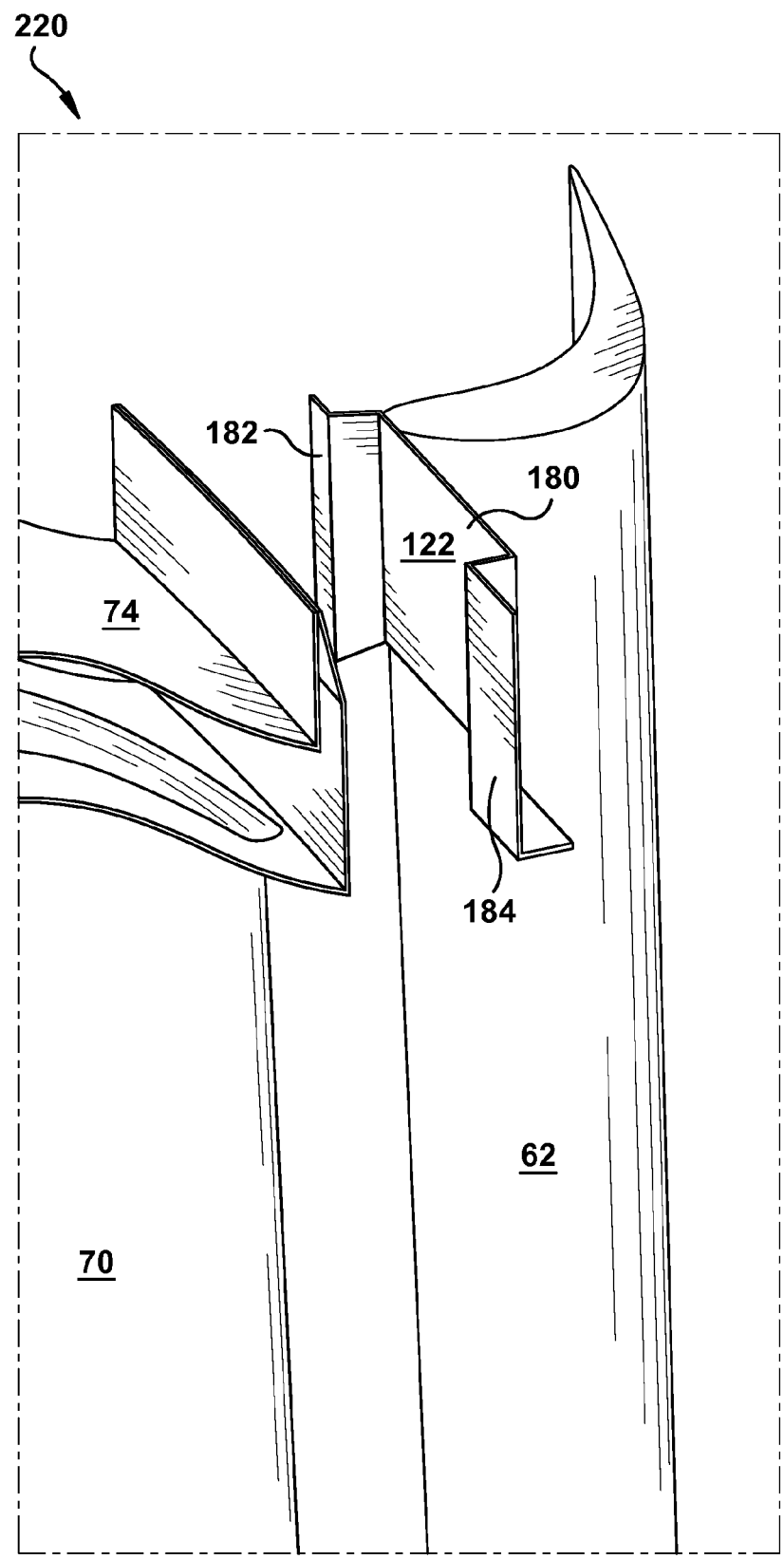
FIG. 5 shows a three-dimensional perspective view of a portion of a turbine according to an embodiment of the invention.

Turning to FIG. 5, a partial three-dimensional perspective view of a portion of an environment 220 including an embodiment of a radial portion 122 of device 120 is shown connected to nozzle 62 proximate bucket tip 74. In this embodiment, radial portion 122 extends radially inboard from a surface of diaphragm 90 toward working fluid passage 7 and includes a central portion 180, a first flange 182 and a second flange 184. Central portion 180 may extend between adjacent nozzles 62 of turbine 100 and may have a substantially smooth surface. Central portion 180 may provide a straight projection (e.g., not radially interrupted) into working fluid passage 7. First flange 182 and second flange 184 may contact and/or connect to complementary portions of adjacent nozzles 62 and/or nozzle roots 60. In one embodiment, first flange 182 and/or second flange 184 may substantially circumferentially locate device 120 within turbine 100. In one embodiment, radial portion 122 may extend between each nozzle 62 and/or nozzle tip 60 of a given stage of turbine 100 forming a continuous surface circumferentially there about.

Figure 6:
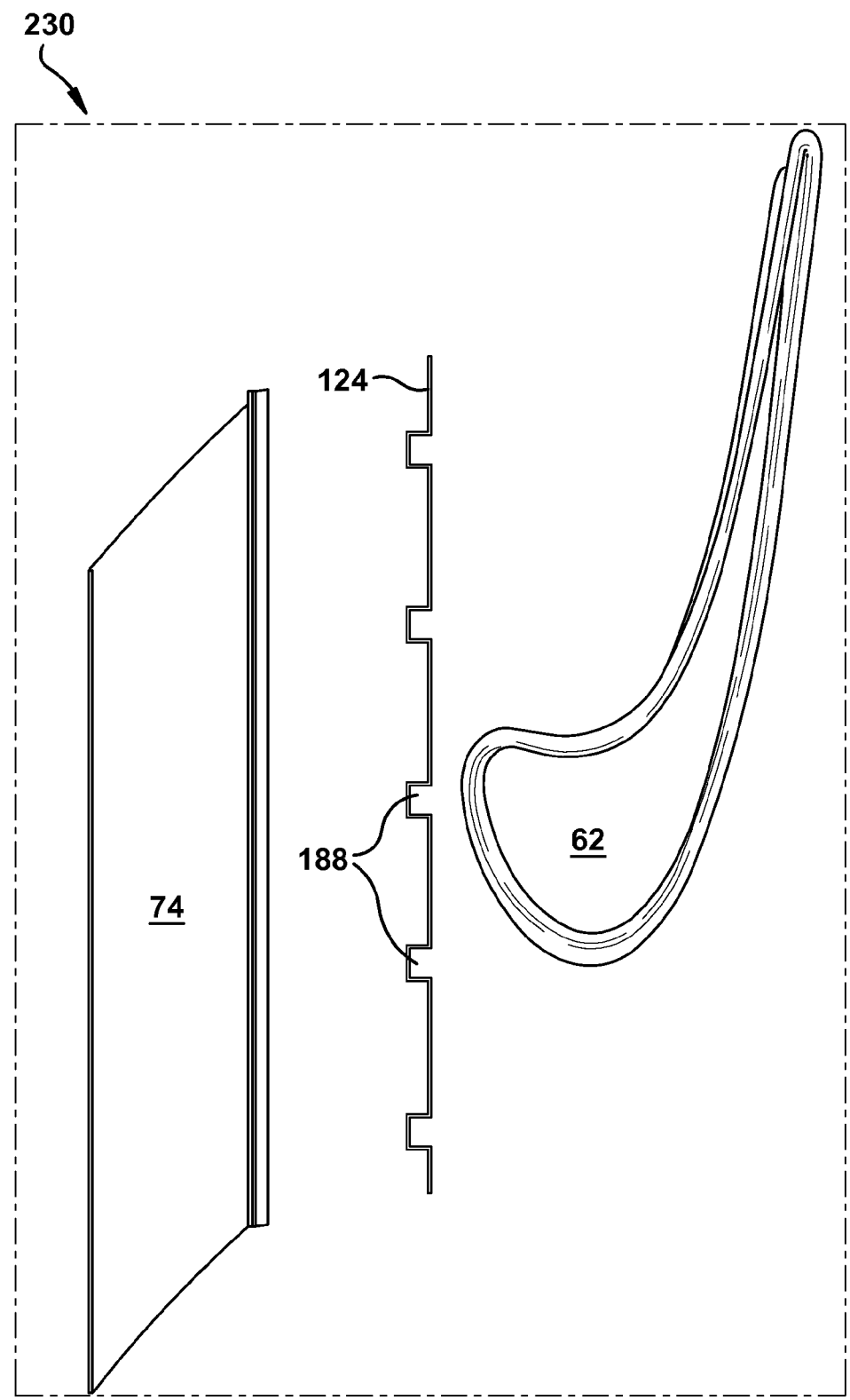
FIG. 6 shows a three-dimensional perspective view of a portion of a turbine according to an embodiment of the invention.

Turning to FIG. 6, a partial three-dimensional perspective view of a portion of an environment 230 including an embodiment of a device 124 is shown. In this embodiment, device 124 is disposed proximate nozzle 62 and includes a set of ridges 188 which run radially across a surface of device 124 opposite bucket tip 74. Set of ridges 188 may be disposed circumferentially between adjacent nozzles 62 and may include angular shaped ridges, rounded ridges, or any other shape of ridges known. During operation, ridges 188 may channel leakage flow 84 and restrict circumferential flow of leakage flow 84. In one embodiment, ridges 188 may be oriented at an angle relative nozzle 62 and/or bucket 70. It is understood that set of ridges 188 may include any number of ridges.

Figure 7:
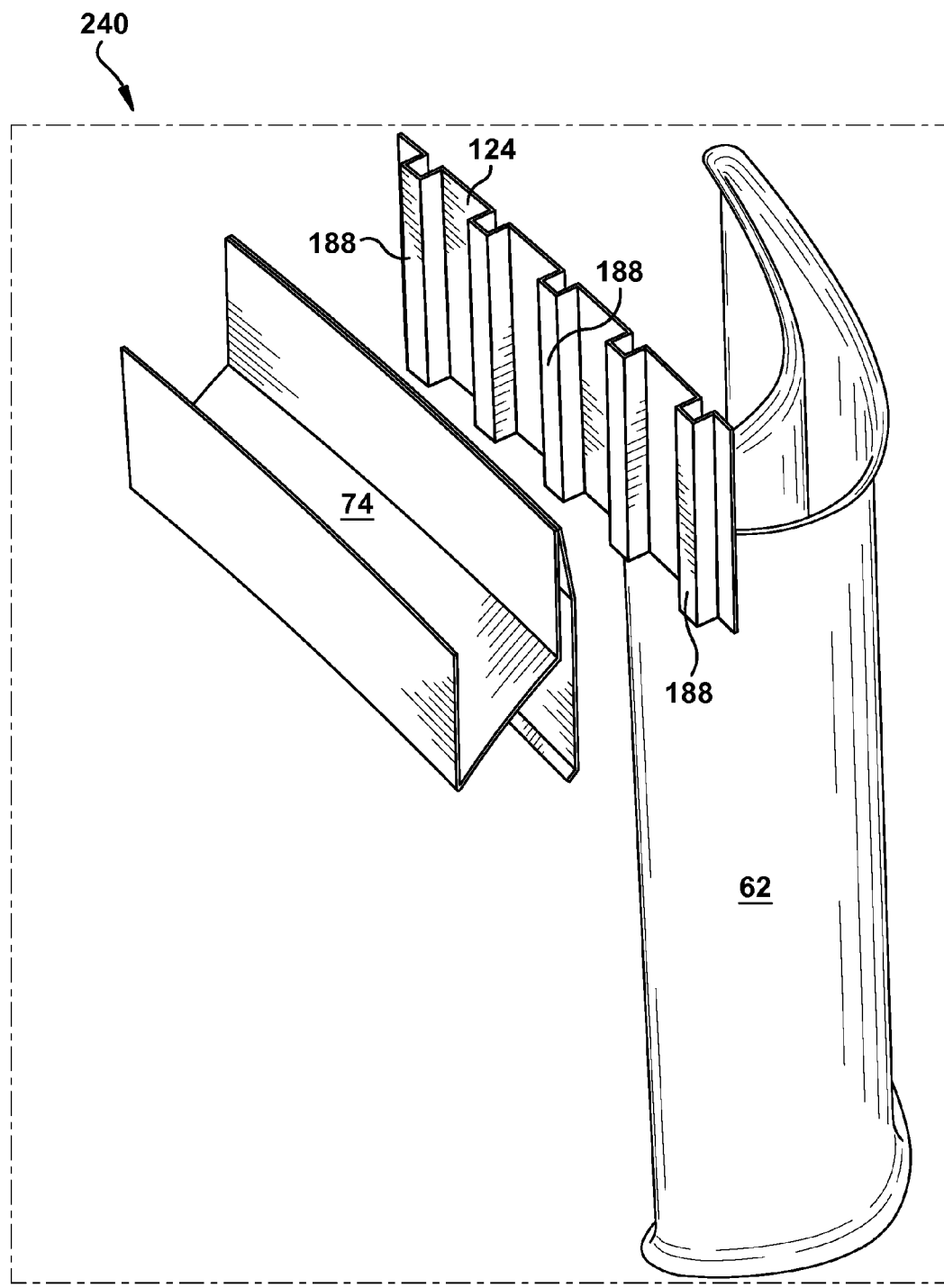
FIG. 7 shows a three-dimensional perspective view of a portion of a turbine according to an embodiment of the invention.
Figure 8:
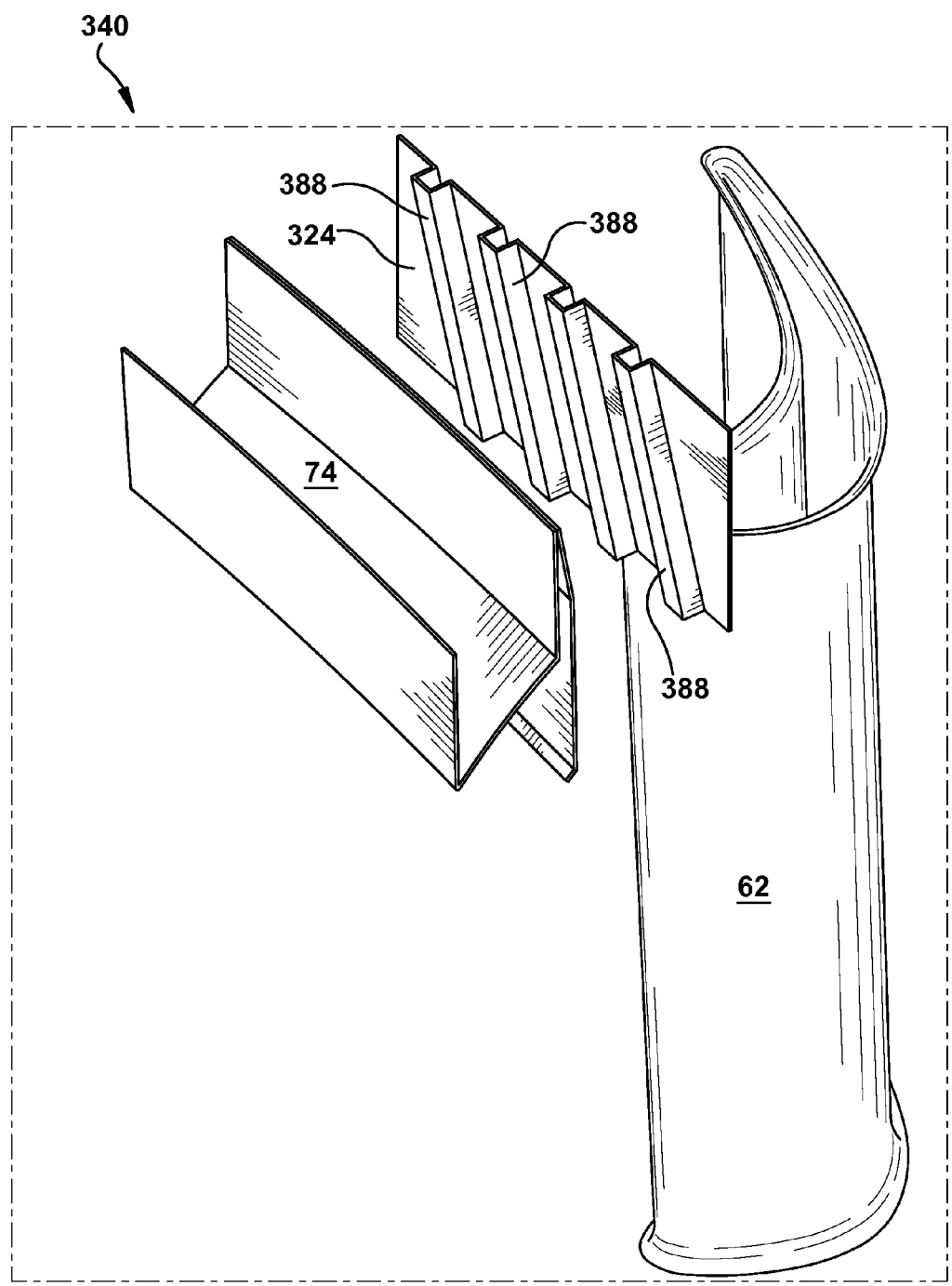
FIG. 8 shows a three-dimensional perspective view of a portion of a turbine according to an embodiment of the invention.
Figure 9:
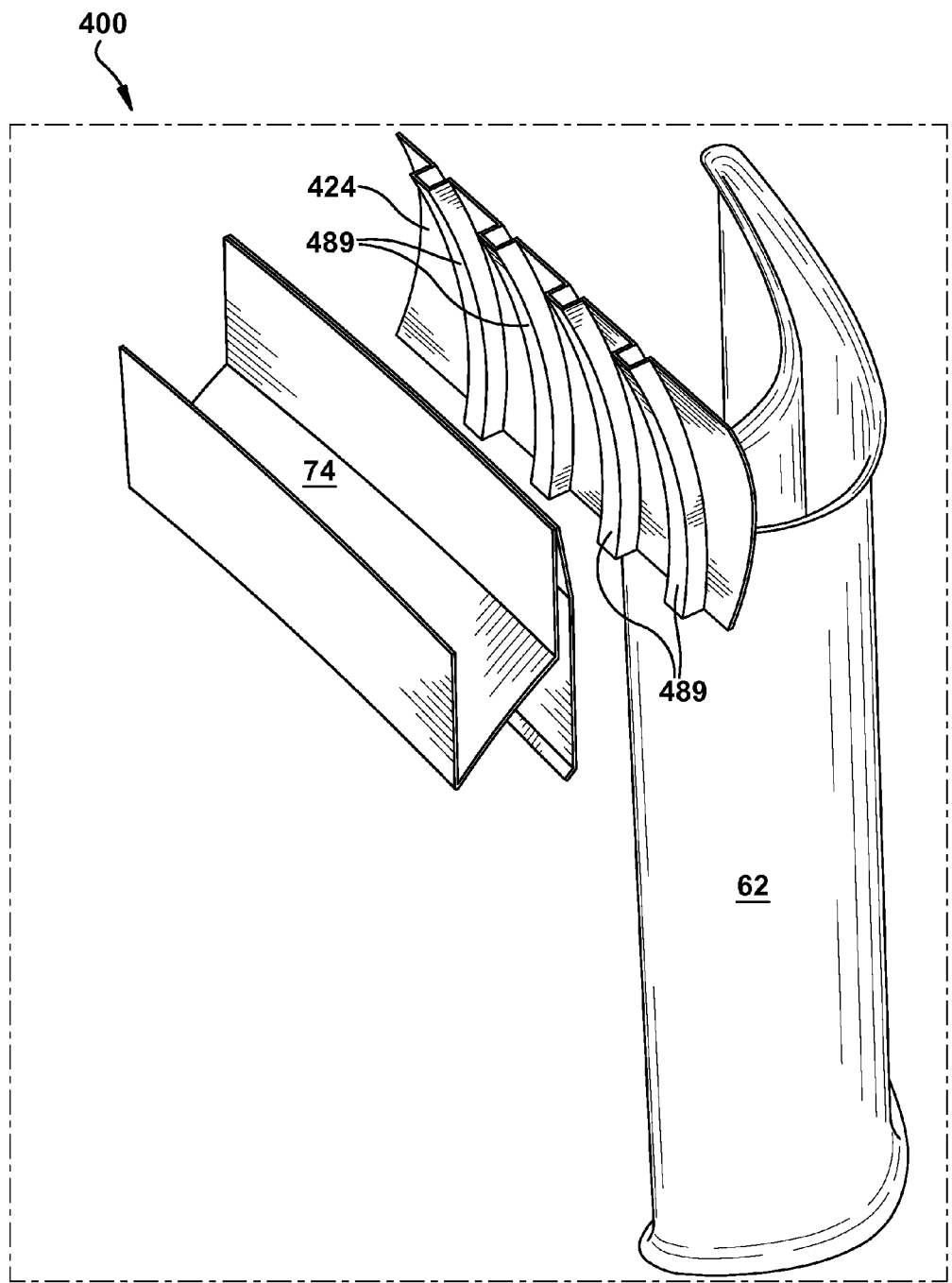
FIG. 9 shows a three-dimensional perspective view of a portion of a turbine according to an embodiment of the invention.

Turning to FIG. 7, a partial three-dimensional perspective view of a portion of an environment 240 including an embodiment of a device 124 connected to nozzle tip 60 and extending radially inboard to contact and/or shield a portion of nozzle 62 is shown. In this embodiment, ridges 188 are oriented radially relative to nozzle 62 (e.g., straight, perpendicular with respect to rotation, etc.) and extend across an entirety of device 124. Device 124 includes a straight projection. In one embodiment, ridges 188 may have a straight shape/orientation which may manipulate a flow characteristic of leakage flow 84. In another embodiment, shown in FIG. 8, a partial three-dimensional perspective view of a portion of an environment 340 including an embodiment of a device 324 connected to nozzle tip 60 and including a set of ridges 388 with an inclined/angled orientation/shape which orients ridges 388 tangential relative to the blade and/or blade direction which may manipulate a flow characteristic of leakage flow 84. It is understood that ridges 388 may be oriented at any angle relative rotation of the turbine. In yet another embodiment, shown in FIG. 9, a partial three-dimensional perspective view of a portion of an environment 400 including an embodiment of a device 424 connected to nozzle tip 60 and including a set of ridges 489 which have a curved shape/orientation extending from a surface of device 424 which may manipulate a flow characteristic of leakage flow 84.

Figure 10:
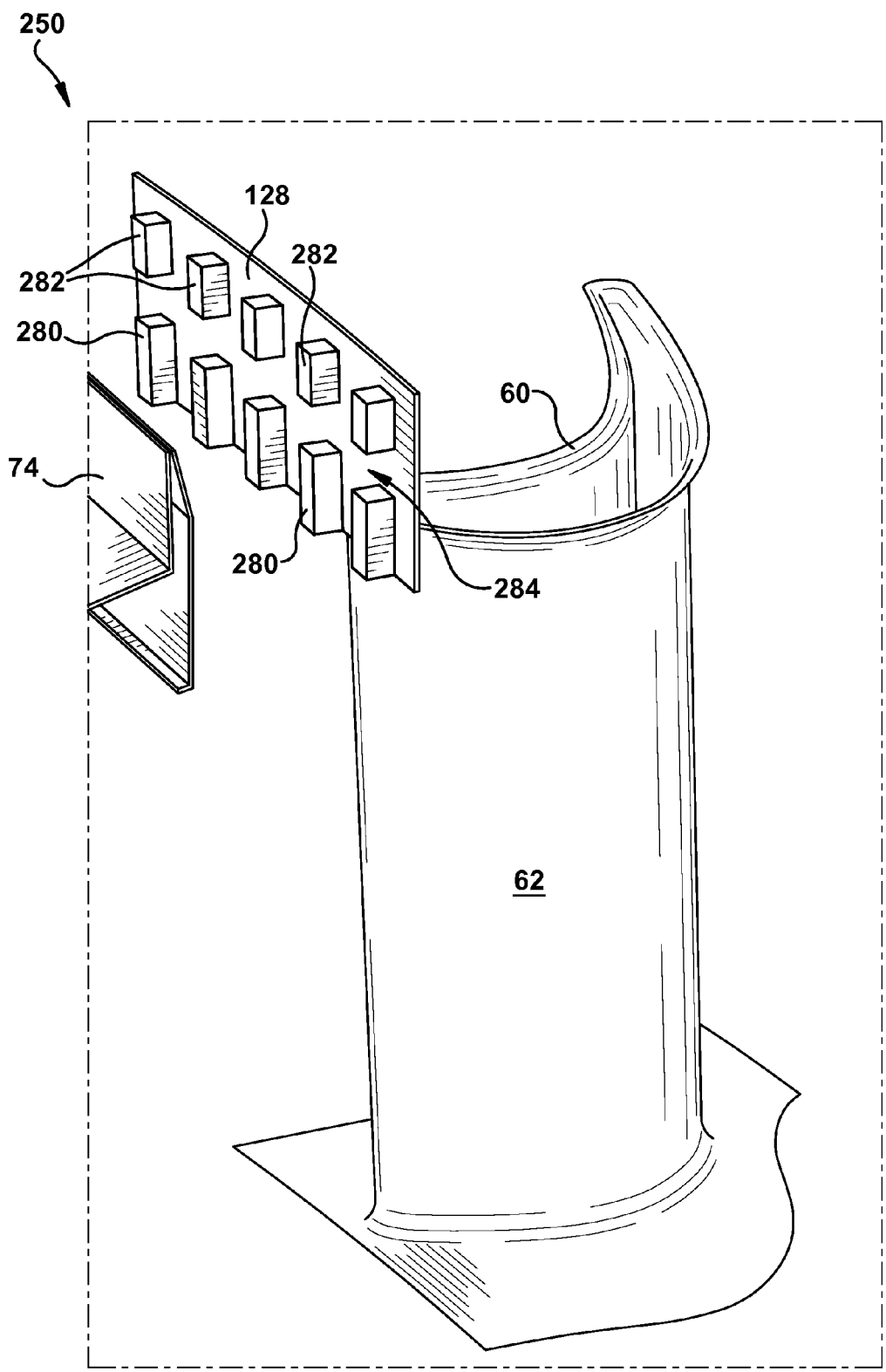
FIG. 10 shows a three-dimensional perspective view of a portion of a turbine according to an embodiment of the invention.

Turning to FIG. 10, a partial three-dimensional perspective view of a portion of an environment 250 including an embodiment of a device 128 is shown connected to diaphragm 90, nozzle tip 60, and/or nozzle 62. In this embodiment, device 128 includes a first set of ridges 280 and a second set of ridges 282. First set of ridges 280 and second set of ridges 282 are disposed on an axial surface of device 128 and are oriented substantially radially. First set of ridges 280 may be positioned radially inboard of second set of ridges 282 and may be separated (e.g., made physically distinct) from second set of ridges 282 by a notch 284 which runs circumferentially across device 128 between first set of ridges 280 and second set of ridges 282 creating a split projection. The split projection may manipulate a swirl angle of leakage flow 84. As leakage flow 84 contacts device 128, portions of leakage flow 84 may be directed circumferentially through notch 284, thereby manipulating a flow characteristic of leakage flow 84. In one embodiment, first set of ridges 280 and second set of ridges 282 may be positioned circumferentially distinct relative to one another (e.g., not directly over one another) so as to further adjust a flow characteristic of leakage flow 84.

Figure 11:
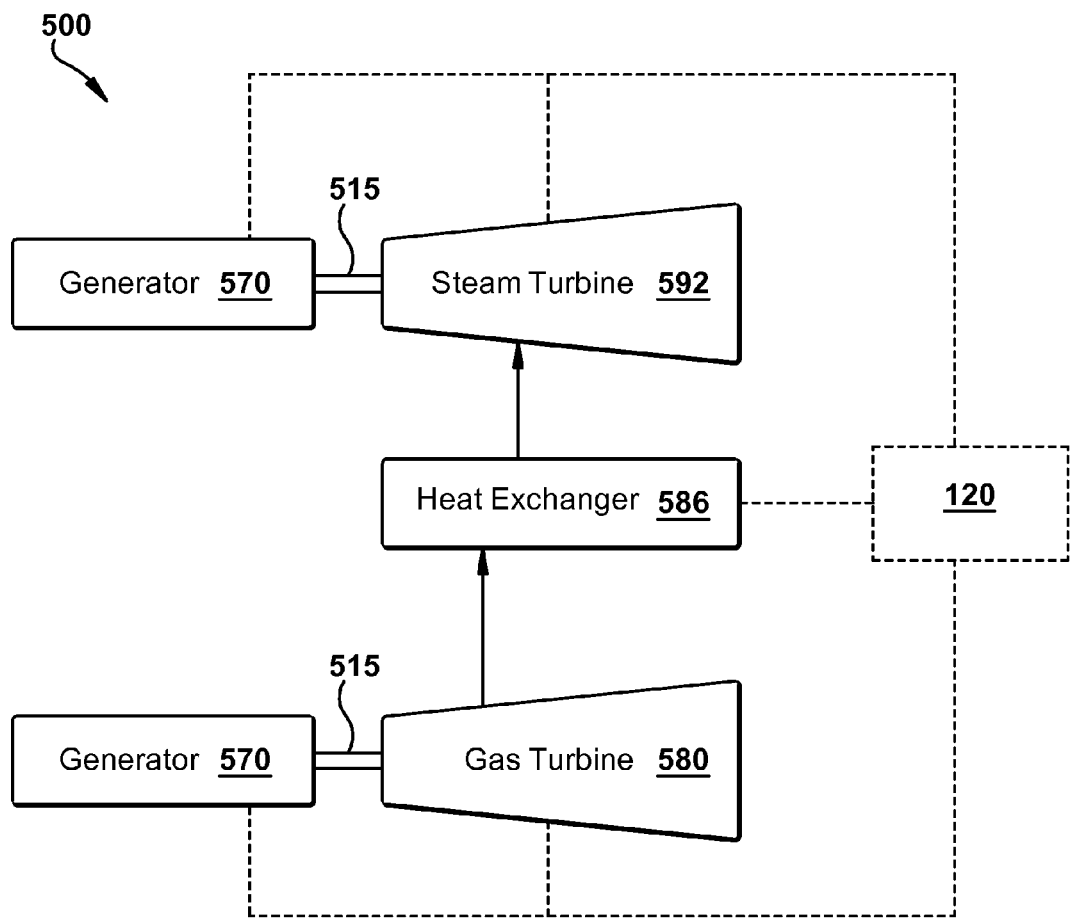
FIG. 11 shows a schematic block diagram illustrating portions of a combined cycle power plant system according to embodiments of the invention.
Figure 12:
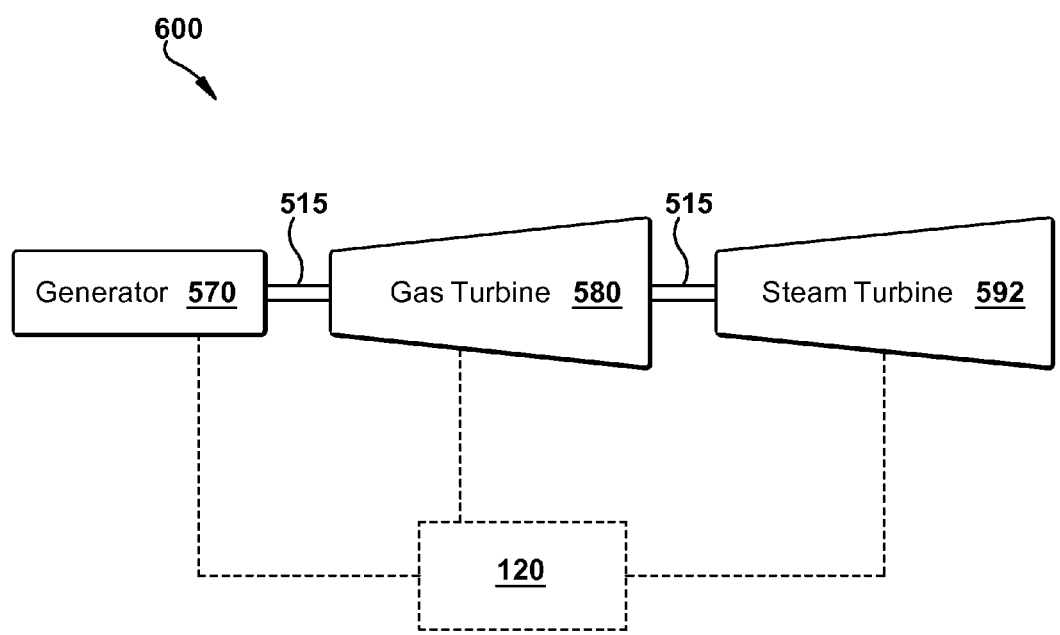
FIG. 12 shows a schematic block diagram illustrating portions of a single-shaft combined cycle power plant system according to embodiments of the invention.

Turning to FIG. 11, a schematic view of portions of a multi-shaft combined cycle power plant 500 is shown. Combined cycle power plant 500 may include, for example, a gas turbine 580 operably connected to a generator 570. Generator 570 and gas turbine 580 may be mechanically coupled by a shaft 515, which may transfer energy between a drive shaft (not shown) of gas turbine 580 and generator 570. Also shown in FIG. 11 is a heat exchanger 586 operably connected to gas turbine 580 and a steam turbine 592. Heat exchanger 586 may be fluidly connected to both gas turbine 580 and a steam turbine 592 via conventional conduits (numbering omitted). Gas turbine 580 and/or steam turbine 592 may be connected to device 120 of FIG. 2 or other embodiments described herein. Heat exchanger 586 may be a conventional heat recovery steam generator (HRSG), such as those used in conventional combined cycle power systems. As is known in the art of power generation, HRSG 586 may use hot exhaust from gas turbine 580, combined with a water supply, to create steam which is fed to steam turbine 592. Steam turbine 592 may optionally be coupled to a second generator system 570 (via a second shaft 515). It is understood that generators 570 and shafts 515 may be of any size or type known in the art and may differ depending upon their application or the system to which they are connected. Common numbering of the generators and shafts is for clarity and does not necessarily suggest these generators or shafts are identical. In another embodiment, shown in FIG. 12, a single shaft combined cycle power plant 600 may include a single generator 570 coupled to both gas turbine 580 and steam turbine 592 via a single shaft 515. Steam turbine 592 and/or gas turbine 580 may be connected to device 120 of FIG. 2 or other embodiments described herein.

The systems and devices of the present disclosure are not limited to any one particular turbine, power generation system or other system, and may be used with other power generation systems and/or systems (e.g., combined cycle, simple cycle, nuclear reactor, etc.). Additionally, the systems and devices of the present invention may be used with other systems not described herein that may benefit from the intrusion loss reduction and leakage guidance of the systems and devices described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine diaphragm system comprising:
an outer ring;
a set of nozzles disposed circumferentially about an interior of the outer ring, the set of nozzles extending radially inboard;
a member connected to an inner surface of the outer ring and extending circumferentially along the outer ring adjacent a portion of the set of nozzles, the member oriented to adjust a direction of a leakage flow of working fluid to a radially inboard direction at an angle complementary to a primary working fluid path;
a first set of ridges extending from the member in an upstream direction relative to the member, each ridge in the first set of ridges circumferentially distanced from one another; and
an inner ring radially inboard of the outer ring and connected to the set of nozzles,
wherein the first set of ridges is disposed on an upstream facing surface of the member, the first set of ridges is oriented substantially radially and is distanced radially inboard from the outer ring.

2. The turbine diaphragm system of claim 1, wherein the member extends continuously along a circumference of the outer ring.

3. The turbine diaphragm system of claim 1, wherein the member includes a plurality of members disposed intermittently about a circumference of the outer ring.

4. The turbine diaphragm system of claim 1, further comprising:
a second set of ridges oriented substantially radially and extending in an upstream direction relative to the member, the second set of ridges disposed on the upstream facing surface of the member radially inboard of the first set of ridges and physically distinct from the first set of ridges.

5. The turbine diaphragm system of claim 1, wherein the first set of ridges is oriented at least one of: straight, inclined, or curved.

6. The turbine diaphragm system of claim 1, wherein the member is located axially upstream relative to at least one nozzle in the set of nozzles.

7. The turbine diaphragm system of claim 1, wherein the first set of ridges includes:
a first flange;
a central portion connected to the first flange, the central portion extending circumferentially; and
a second flange connected to the central portion, the second flange located substantially opposite the first flange.

8. A turbine, comprising:
a stator;
a turbine diaphragm system disposed within the stator, the turbine diaphragm system including:
an outer ring;
a set of nozzles disposed circumferentially about an interior of the outer ring, the set of nozzles extending radially inboard;
a member connected to an inner surface of the outer ring and extending circumferentially along the outer ring adjacent a portion of the set of nozzles, the member oriented to adjust a direction of a leakage flow of working fluid to a radially inboard direction at an angle complementary to a working fluid passage;
a first set of ridges extending from the member in an upstream direction relative to the member, each ridge in the first set of ridges circumferentially distanced from one another,
wherein the first set of ridges is disposed on an upstream facing surface of the member, the first set of ridges is oriented substantially radially and is distanced radially inboard from the outer ring; and
an inner ring radially inboard of the outer ring and connected to the set of nozzles; and
a rotor configured radially inboard of the working fluid passage.

9. The turbine of claim 8, further comprising:
a second set of ridges oriented substantially radially and extending in an upstream direction relative to the member, the second set of ridges disposed on the upstream facing surface of the member radially inboard of the first set of ridges and physically distinct from the first set of ridges.

10. The turbine of claim 8, wherein the first set of ridges is oriented at least one of: straight, inclined, or curved.

11. The turbine of claim 8, wherein the first set of ridges includes:
a first flange;
a central portion connected to the first flange, the central portion extending circumferentially; and
a second flange connected to the central portion, the second flange located substantially opposite the first flange.

* * * * *